United States Patent [19]

Chandra et al.

[11] 4,283,526

[45] Aug. 11, 1981

[54] METHOD OF TREATING POLYMERLATICES

[75] Inventors: Bala P. Chandra, Huntingdon; Jeffrey C. Greaves; Victor G. Lovelock, both of Welwyn Garden City, all of England

[73] Assignee: Imperial Chemical Industries Limited, London, England

[21] Appl. No.: 20,924

[22] Filed: Mar. 15, 1979

Related U.S. Application Data

[63] Continuation of Ser. No. 728,994, Oct. 4, 1976, now Defensive Publication No. T962,008.

[30] Foreign Application Priority Data

Oct. 13, 1975 [GB] United Kingdom ............... 41848/75

[51] Int. Cl.³ ............................. C08F 6/16; C08F 6/14
[52] U.S. Cl. .................................. 528/500; 159/4 CC; 260/29.6 PT; 528/501
[58] Field of Search .......................................... 528/500

[56] References Cited

U.S. PATENT DOCUMENTS

| 3,547,865 | 12/1970 | Hoch ............................... 528/502 X |
| 4,031,056 | 6/1971 | Patel ............................. 260/29.6 PT |
| 4,032,497 | 6/1977 | Kidoh ............................. 260/29.6 R |
| 4,158,092 | 6/1979 | Bötsch ................................. 528/500 |

FOREIGN PATENT DOCUMENTS 2162860 7/1972 Fed. Rep. of Germany .

*Primary Examiner*—C. A. Henderson
*Attorney, Agent, or Firm*—Cushman, Darby & Cushman

[57] ABSTRACT

A method of continuously treating an aqueous latex of a synthetic polymer which contains unreacted residual monomer from the polymerization reaction used for the production of the polymer, which method comprises feeding the aqueous latex as a spray into a vessel defining a chamber so that all or a substantial quantity of the droplets of spray avoid contact with the side wall of the chamber, and contacting the falling spray with steam flowing counter-current thereto whereby residual monomer is removed with the flow of steam leaving the chamber. Apparatus for carrying out the method is also claimed. The method is advantageously employed for the removal of residual vinyl chloride monomer from a latex of a vinyl chloride polymer.

5 Claims, 1 Drawing Figure

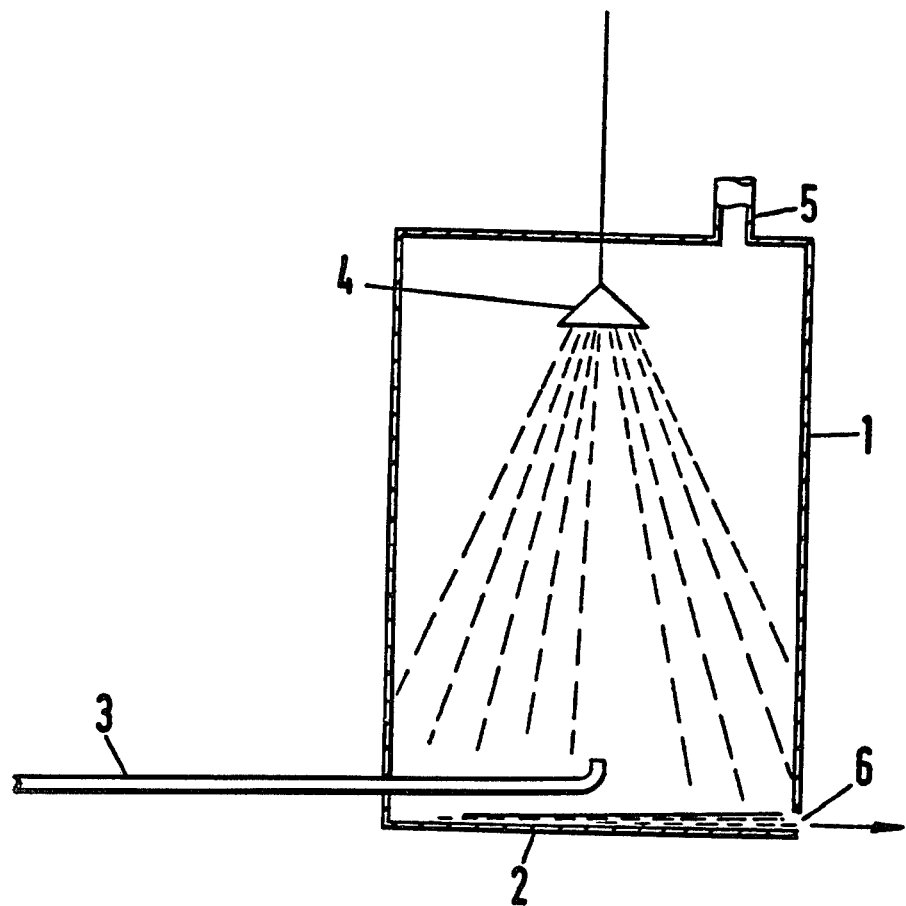

METHOD OF TREATING POLYMERLATICES

This is a continuation of application Ser. No. 728,994, filed Oct. 4, 1976, now defensive publication T 962,008 published Sept. 6, 1977.

BACKGROUND OF THE INVENTION

The present invention relates to a method of treating an aqueous latex of a synthetic polymer which contains unreacted residual monomer from the polymerisation reaction used for the production of the polymer.

The production of a latex of a synthetic polymer is conventionally carried out by polymerising the constituent monomer or monomers for the polymer using an aqueous emulsion or micro suspension process. The latex, after polymerisation, invariably contains a significant quantity of residual monomer. In cases where the monomer is a low boiling liquid (e.g. vinyl chloride) and the polymerisation has been carried out under the autogenous monomer pressure, much of the residual monomer in the reaction vessel at the end of the polymerisation may be removed by venting (via e.g. a monomer trap). Nevertheless, even in these cases, the resulting latex will still contain an appreciable quantity of residual monomer after venting, e.g. dissolved in the aqueous phase and/or absorbed by the polymer particles.

It is often desirable to remove virtually all of the residual monomer from the polymer, particularly if the quality of the polymer is improved thereby, or if the monomer is expensive and merits recovery, or if the presence of even very small quantities of monomer in the polymer represents a hazard (e.g. a toxicity or an explosion hazard). It is therefore desirable to significantly reduce the residual monomer context of the latex since this places a lower burden on the equipment employed in subsequent work-up stages for removing and trapping the last traces of monomer and may also allow the latex to be stored with a greater degree of safety.

It is known to separate residual monomer from an aqueous polymer latex or slurry by sparging the polymer dispersion with a hot inert vapour or gas such as steam, wherein steam is bubbled through the dispersion by injecting steam into the dispersion and/or causing the dispersion to boil; the efficiency of the sparging process may be improved by operation at an elevated temperature and under reduced pressure. However, this technique can be disadvantageous when applied to polymer latices since the treatment of the latex in bulk for a prolonged period of time at a high temperature may impair its stability which can lead to coagulation problems. Furthermore, application of reduced pressure, which would allow a shorter sparging period at high temperatures, often causes unacceptable foaming difficulties. In view of this, the sparging technique when applied to latices must often be operated at rather low temperatures which may not always provide effective monomer separation.

It has been proposed to overcome these difficulties by using a continuous process wherein a latex is applied at the top of a tower containing a vertical tubular column (or a plurality of spaced vertical tubular columns) so that the latex overflows into the column and descends down it as a thin film on the inner wall thereof while being contacted at an elevated temperature with a co- or counter-current stream of an inert gas such as air or nitrogen. This technique is nevertheless not entirely satisfactory if applied in respect of latices containing large quantities of residual monomer (particularly if that monomer is a low boiling substance such as vinyl chloride) since extensive foaming may occur within the column, causing flooding of the descending latex.

SUMMARY OF THE INVENTION

According to the present invention there is provided a method of continuously treating an aqueous latex of a synthetic polymer which contains unreacted residual monomer from the polymerisaion reaction used for the production of the polymer, which method comprises feeding the aqueous latex as a spray into a vessel defining a chamber so that all or a substantial quantity of the droplets of spray avoid contact with the side wall of the chamber, and contacting the falling spray with steam flowing counter-current thereto, whereby residual monomer is separated from the latex and is removed with the flow of steam leaving the chamber. Preferably at least 80% by weight of the droplets of spray avoid contact with the side wall of the chamber.

There is also provided according to the invention, apparatus for continuously treating an aqueous latex of a synthetic polymer which contains unreacted residual monomer from the polymerisation reaction used for the production of the polymer, which apparatus comprises a vessel defining a chamber having a spraying head therein for delivering latex as falling spray into the chamber such that all or a substantial quantity of the droplets of spray avoids contact with the side wall of the chamber, and means to provide a flow of steam up the chamber to contact the falling spray.

BRIEF DESCRIPTION OF THE DRAWING

The attached FIGURE illustrates an apparatus for the continuous treatment of an aqueous latex of a synthetic polymer according to the method of the invention.

DETAILED DESCRIPTION OF THE INVENTION

Thus in the method of the invention all or most of the spray falls directly to the bottom of the chamber without touching the side wall of the chamber. In this way foaming difficulties are avoided. The droplets of spray are contacted by the rising steam and monomer is removed with the steam flow. The latex which collects in the bottom of the vessel may be removed by any convenient method, e.g. by allowing it to run out of the chamber by gravity or by pumping it out of the chamber.

The chamber used in the process of the invention may be any suitable shape, but is conveniently defined by a wide cylindrical tube, the spray being introduced through a spraying head at the top of the tube. The size of the chamber used will depend, inter alia, on the required residence time of the latex in the chamber; the efficiency of monomer removal will depend on the residence time of the latex at a particular contact temperature. It is to be understood that the method of the invention may employ a plurality of such chambers operated sequentially or contemporaneously.

The treated latex leaving the bottom of the vessel is collected and may be stored or treated further to concentrate or dry it.

The steam is preferably introduced into the chamber through a single injection point positioned at or near the bottom of the chamber although one or more injection points intermediate of the top and bottom of the vessel may be used as well.

The optimum flow rate for the steam will depend on the throughput of the latex through the chamber, the nature of the unreacted monomer, and its concentration in the latex.

The temperature of the steam before injection into the chamber may be within the range 60°–150° C., but is preferable at or near 100° C., and the temperature of the steam inside the chamber may be adjusted by varying the pressure inside the chamber below atmospheric pressure. Operation at reduced pressure also enhances the removal of monomer from the latex and allows the use of a lower treatment temperature thereby safeguarding heat stability if this is a critical problem at the contact temperature employed. Nevertheless for convenience, the pressure inside the chamber is often atmospheric so that the temperature of steam inside the reactor is at or near 100° C. and this is a satisfactory arrangement for the treatment of many latices. To facilitate uniform fluid gas flow in the vessel, the steam may be introduced into the vessel through a distributor.

The aqueous latex may be introduced into the vessel while it is at a low temperature (e.g. room temperature, say 15°–30° C.) or alternatively it may be preheated to or near the treatment temperature. If injected at room temperature, contact with the rising steam immediately raises its temperature to within the treatment temperature range. The temperature of the latex spray during the treatment should be such that effective monomer removal is achieved according to the invention. This should be chosen according to the volatility of the monomer being removed, its concentration in the latex and the throughput rate of the latex through the chamber. Preferably the temperature of the latex during the treatment as spray is not more than 50° C. below (particularly not more than 40° C. below) the boiling point of the aqueous latex at the pressure inside the chamber. Conveniently the contact treatment is carried out within the temperature range 30°–0° C. (particularly 10°–0° C.) below the temperature at which the latex boils at the pressure inside the chamber.

The aqueous latex used in the invention may be of synthetic rubber or resin and contains unreacted monomer used in the polymerisation process for the production thereof. The method of the invention is very suitable for the treatment of latices containing low boiling monomers. In particular the aqueous latex is one of a homo- or copolymer of vinyl chloride and contains unreacted vinyl chloride monomer. (Nevertheless polymer latices derived from and containing unreacted high boiling monomer, even monomer boiling at a higher temperature than water, may be successfully treated by the process of the invention, in view of the relationship between vapour pressure and the equilibrium concentration in the vapour phase.)

In the method of the invention the steam and monomer removed with the steam flow are preferably trapped and recovered rather than discharged to the surrounding environment.

The latex may be atomised into droplets of spray using any suitable spraying head, e.g. by pumping the latex through a conventional pressure-nozzle or through a spinning disc atomiser as used in spray driers, or through a pneumatic atomiser.

In the process of the invention the steam emerging from the chamber and/or the hot latex from the bottom of the chamber may advantageously be employed, using heat exchange means, to warm the latex being fed to the chamber, thereby enabling a considerable saving of power to be achieved compared to systems where the heat for this purpose is generated separately.

The present invention is illustrated by the following description of a laboratory-scale embodiment thereof with reference to the accompanying drawing which is a schematic representation of apparatus for use in the removal of residual vinyl chloride monomer from an aqueous emulsion of vinyl chloride polymer.

DETAILED DESCRIPTION OF THE DRAWING

With reference to the accompanying drawing the apparatus comprises a vessel in the form of a drum (1) 12 inches (305 mm) in diameter and 18 inches (457 mm) in height, the drum being slightly tilted from the vertical so that it provides a sloping base (2) (alternatively the base of the drum may be suitably shaped to provide a slope). The drum defines a chamber which is provided centrally with a steam injection inlet (3) at the bottom and a pressure-nozzle atomiser (4) at the top. The apparatus is provided with means (not shown) connected through outlet (5) for condensing the steam flow and trapping separated vinyl chloride monomer. Also provided is means (not shown) to collect treated latex leaving through outlet (6).

In operation, latex is pumped to the spray head (4) and delivered as spray inside the drum (1). The spray falls to the base (2), mostly without touching the side of the drum and is contacted by rising steam issuing from (3) whereby residual vinyl chloride is separated. The treated latex runs out of the drum through an orifice (6).

PREFERRED EMBODIMENT OF THE INVENTION

The above-described apparatus was employed to remove residual vinyl chloride from an aqueous emulsion of a vinyl chloride homopolymer containing by weight 20,700 parts per million of unreacted vinyl chloride monomer (based on dry polymer). The latex, at room temperature, was pumped through the atomiser and contacted by rising steam injected at 100° C. The pressure inside the drum was atmospheric. The vinyl chloride monomer content of the collected latex was found to be 415 parts per million (by weight based on dry polymer) and completely free from foaming. No build-up occurred within the apparatus.

It is to be understood that while the foregoing description relates to laboratory-scale apparatus, suitable modifications and variations are envisaged within the scope of the invention for application to industrial-scale use. For example, the latex which collects at the bottom of the drum may be removed by pumping it out of the drum. The drum itself can be suitably lagged to prevent heat loss.

We claim:

1. A method of continuously treating an aqueous latex of a vinyl chloride polymer which contains unreacted residual monomer from the polymerisation reaction used for the production of the polymer, which method comprises:
   (a) feeding the aqueous latex as a spray at a temperature within the range of 30°–0° C. below the boiling point of the latex into a vessel defining a chamber so that at least 80% by weight of the droplets of spray avoid contact with the side wall of the chamber, wherein the pressure inside the chamber is atmospheric or less than atmospheric, and
   (b) contacting the falling spray with steam flowing counter-current thereto, whereby residual monomer is removed with the flow of steam leaving the chamber.

2. A method according to claim 1 wherein the steam leaving the chamber and/or the hot latex from the bottom of the chamber is employed, using heat exchange means, to warm the latex being fed to the chamber.

3. A method according to claim 1 wherein the steam is introduced into the chamber through a single injection point positioned at or near the bottom of the chamber.

4. A method according to claim 1 wherein the temperature of the steam before introduction into the chamber is within the range 50° to 150° C.

5. A method according to claim 1 wherein the temperature of the aqueous latex is within the range 10°–0° C. below the boiling point of the latex at the pressure inside the chamber.

* * * * *